(12) United States Patent
Lin

(10) Patent No.: US 8,879,156 B2
(45) Date of Patent: Nov. 4, 2014

(54) DISPLAY SYSTEM, HEAD-UP DISPLAY, AND KIT FOR HEAD-UP DISPLAYING

(75) Inventor: Ching-An Lin, New Taipei (TW)

(73) Assignee: Wistron Corporation, New Taipei (TW)

(*) Notice: Subject to any disclaimer, the term of this patent is extended or adjusted under 35 U.S.C. 154(b) by 69 days.

(21) Appl. No.: 13/350,903

(22) Filed: Jan. 16, 2012

(65) Prior Publication Data

US 2012/0188651 A1 Jul. 26, 2012

(30) Foreign Application Priority Data

Jan. 20, 2011 (TW) .................................. 100102133

(51) Int. Cl.
*G02B 27/14* (2006.01)
*G02B 7/00* (2006.01)
*G02B 27/01* (2006.01)

(52) U.S. Cl.
CPC .......... *G02B 7/005* (2013.01); *G02B 2027/014* (2013.01); *G02B 27/01* (2013.01); *G02B 2027/0154* (2013.01); *G02B 2027/0123* (2013.01)
USPC .......................................... 359/630; 359/633

(58) Field of Classification Search
CPC ................. G02B 2027/0123; G02B 2027/014; G02B 2027/0154; G02B 27/01; G02B 7/005
USPC ................................................. 359/629–640
See application file for complete search history.

(56) References Cited

U.S. PATENT DOCUMENTS

| | | | |
|---|---|---|---|
| 8,451,111 B2 * | 5/2013 | Sasaki et al. | 340/461 |
| 2009/0034087 A1 | 2/2009 | Hung et al. | |
| 2009/0201589 A1 | 8/2009 | Freeman | |
| 2009/0309964 A1 * | 12/2009 | Schrage | 348/82 |
| 2009/0326817 A1 | 12/2009 | Lin | |
| 2010/0157430 A1 * | 6/2010 | Hotta et al. | 359/630 |
| 2011/0316721 A1 | 12/2011 | Chen | |

FOREIGN PATENT DOCUMENTS

| | | |
|---|---|---|
| TW | 201001131 A | 6/2008 |
| TW | 201033723 A1 | 12/2009 |

OTHER PUBLICATIONS

Office Action with translation dated Aug. 5, 2013 from Taiwanese Application No. 10221035510, 7 pages.
Office Action dated Jun. 12, 2014 from co-pending CN Application No. 201110037966.9, 13 pages.

* cited by examiner

*Primary Examiner* — Thomas K Pham
*Assistant Examiner* — Vipin Patel
(74) *Attorney, Agent, or Firm* — Hollingsworth Davis, LLC

(57) ABSTRACT

A head-up display device includes a light source, a reflector, a reflector control unit, and a surface. The light source provides a light signal that corresponds to display data. The reflector is disposed rotatably in a first optical path of the light signal. The reflector control unit receives a control signal corresponding to the display data and controls rotation of the reflector about a rotational center. The surface is disposed in a second optical path. When the reflector is rotated for a predetermined rotational angle by the reflector control unit according to the control signal, the light signal reflected by the reflector is projected on the surface to display an image corresponding to the display data on a predetermined region of the surface.

1 Claim, 5 Drawing Sheets

DISPLAY SYSTEM, HEAD-UP DISPLAY, AND KIT FOR HEAD-UP DISPLAYING

CROSS-REFERENCE TO RELATED APPLICATION

This application claims priority of Taiwanese Application No. 100102133, filed on Jan. 20, 2011, the disclosures of which are incorporated herein by reference.

BACKGROUND OF THE INVENTION

1. Field of the Invention

The invention relates to a display system, more particularly to a display system having a head-up display (HUD) device.

2. Description of the Related Art

Referring to FIG. 1, a conventional HUD device 1 includes a cathode ray tube (CRT) display 11 for providing a light signal, a relay lens unit 12, a reflector 13 and a combiner 14. The relay lens unit 12 transmits the light signal, which is then reflected by the reflector 13 and projected on a surface 141 of the combiner 14. The combiner 14 is capable of reflecting the light signal on the surface 141 and projecting together with external light signals to a user's eyes.

Recently, the conventional HUD device 1 is commonly used as an in-vehicle auxiliary device in order to provide a safe driving environment, so that the driver is able to obtain information such as vehicle speed and fuel consumption without lowering down the driver's head to look at the dashboard.

The conventional HUD device 1 can also be applied in communication or navigation systems to display communication and navigation information.

When using the conventional HUD device 1, the field of view of the driver is fixed. Increasing the sizes of the CRT display 11, the relay lens unit 12, the reflector 13 and the combiner 14 may enable the conventional HUD device 1 to display more information simultaneously, but also increases the manufacturing cost of the HUD device 1.

SUMMARY OF THE INVENTION

Therefore, an object of the present invention is to provide a display system including a head-up device having an expanded and adjustable field of view.

Accordingly, a display system of the present invention includes a processing unit and a head-up display device. The processing unit transmits at least one piece of display data and at least one control signal that corresponds to the display data. The head-up display device receives the display data and the control signal, and performs display according to the display data and the control signal.

The head-up display device includes a light source, a reflector, a reflector control unit and a surface. The light source is for providing a light signal that corresponds to the display data. The reflector is disposed rotatably in a first optical path of the light signal provided by the light source for reflecting the light signal provided by the light source to a second optical path. The reflector control unit is for receiving the control signal for controlling the rotation of the reflector about a rotational center according to the control signal, thereby adjusting the second optical path of the light signal reflected by the reflector. The surface is disposed in the second optical path. When the reflector is rotated for a predetermined rotational angle about the rotational center by the reflector control unit according to the control signal, the light signal reflected by the reflector is projected on the surface to display an image corresponding to the display data on a predetermined region of the surface.

Another object of the present invention is to provide a head-up display device that is adapted for receiving a piece of display data and a control signal that corresponds to the display data, and that includes a light source, a reflector, a reflector control unit and a surface. The light source is for providing at least one light signal that corresponds to the display data. The reflector is disposed rotatably in a first optical path of the light signal provided by the light source for reflecting the light signal provided by the light source to a second optical path. The reflector control unit is for receiving the control signal and controlling rotation of the reflector about a rotational center according to the control signal, thereby adjusting the second optical path of the light signal reflected by the reflector. The surface is disposed in the second optical path. When the reflector is rotated for a predetermined rotational angle about the rotational center by the reflector control unit according to the control signal, the light signal reflected by the reflector is projected on the surface to display an image corresponding to the display data on a predetermined region of the surface.

Still another object of the present invention is to provide a head-up display device adapted to be connected detachably to a portable electronic device that has a display for providing at least one light signal corresponding to a piece of display data, and that generates a control signal corresponding to the at least one piece of display data. The head-up display device includes a base seat, a reflector, a reflector control unit and a surface. The base seat is adapted to be connected detachably to the portable electronic device. The reflector is adapted to be disposed rotatably in a first optical path of the light signal provided by the display for reflecting the light signal provided by the display to a second optical path. The reflector control unit is adapted for receiving the control signal and controlling rotation of the reflector about a rotational center according to the control signal, thereby adjusting the second optical path of the light signal reflected by the reflector. The surface is disposed in the second optical path. When the reflector is rotated for a predetermined rotational angle about the rotational center by the reflector control unit according to the control signal, the light signal reflected by the reflector is projected on the surface to display an image corresponding to the display data on a predetermined region of the surface.

Yet another object of the present invention is to provide a kit used for a head-up display system and including a base seat, a rotatable reflector, a reflector control unit for controlling the rotation of the reflector, and a surface. When the base seat is connected to a portable electronic device that has a display, the display of the portable electronic device provides at least one light signal that corresponds to a piece of display data, and the reflector control unit controls the reflector to rotate about a rotational center for a predetermined angle according to a control signal that corresponds to the display data, so that the light signal provided by the display and reflected by the reflector is projected on the surface to display an image corresponding to the display data on a predetermined region of the surface.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Figure 1:
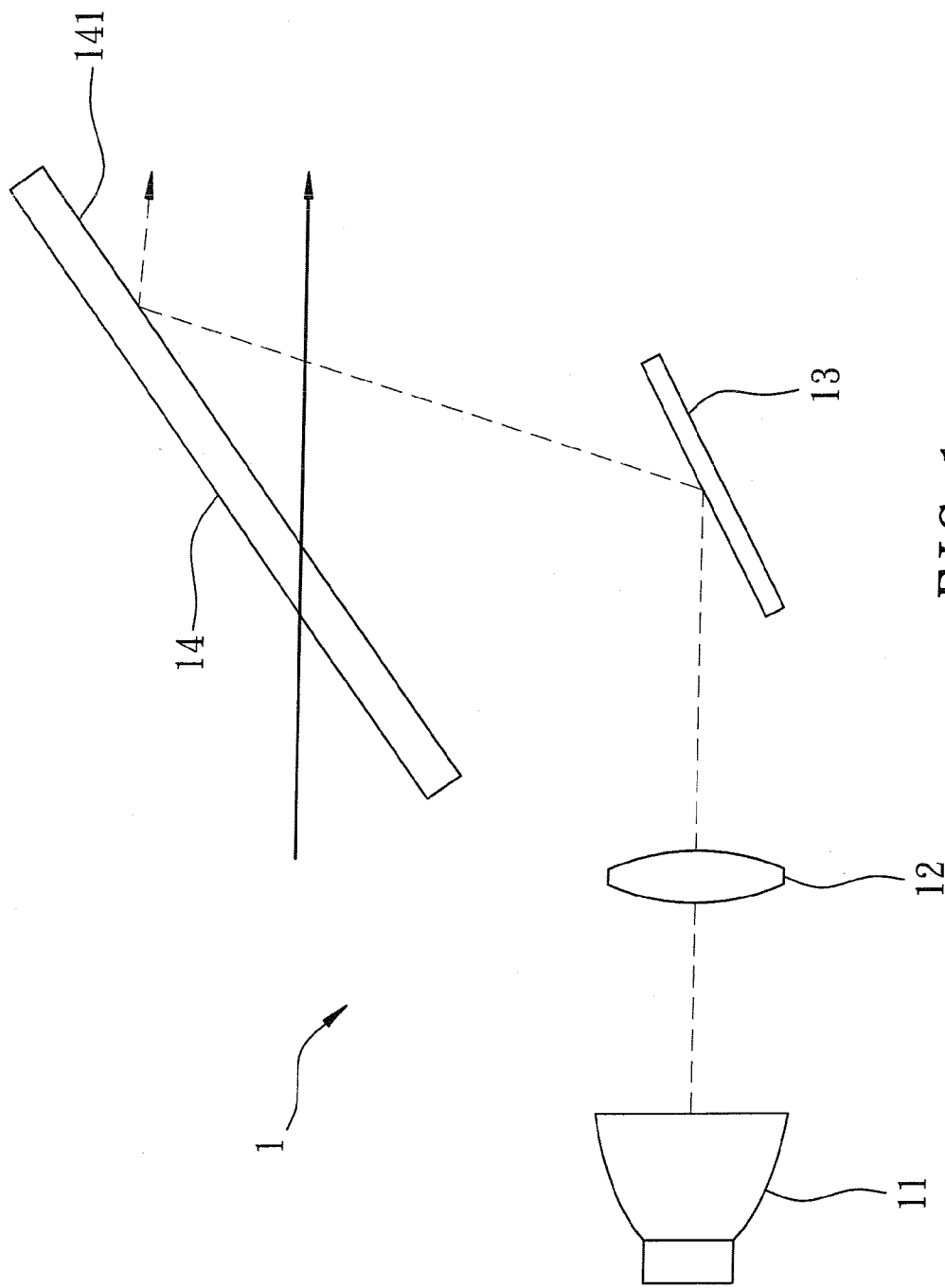
FIG. 1 is a schematic diagram of a conventional head-up display device.

Before the present invention is described in greater detail, it should be noted that like elements are denoted by the same reference numerals throughout the disclosure.

Figure 2:
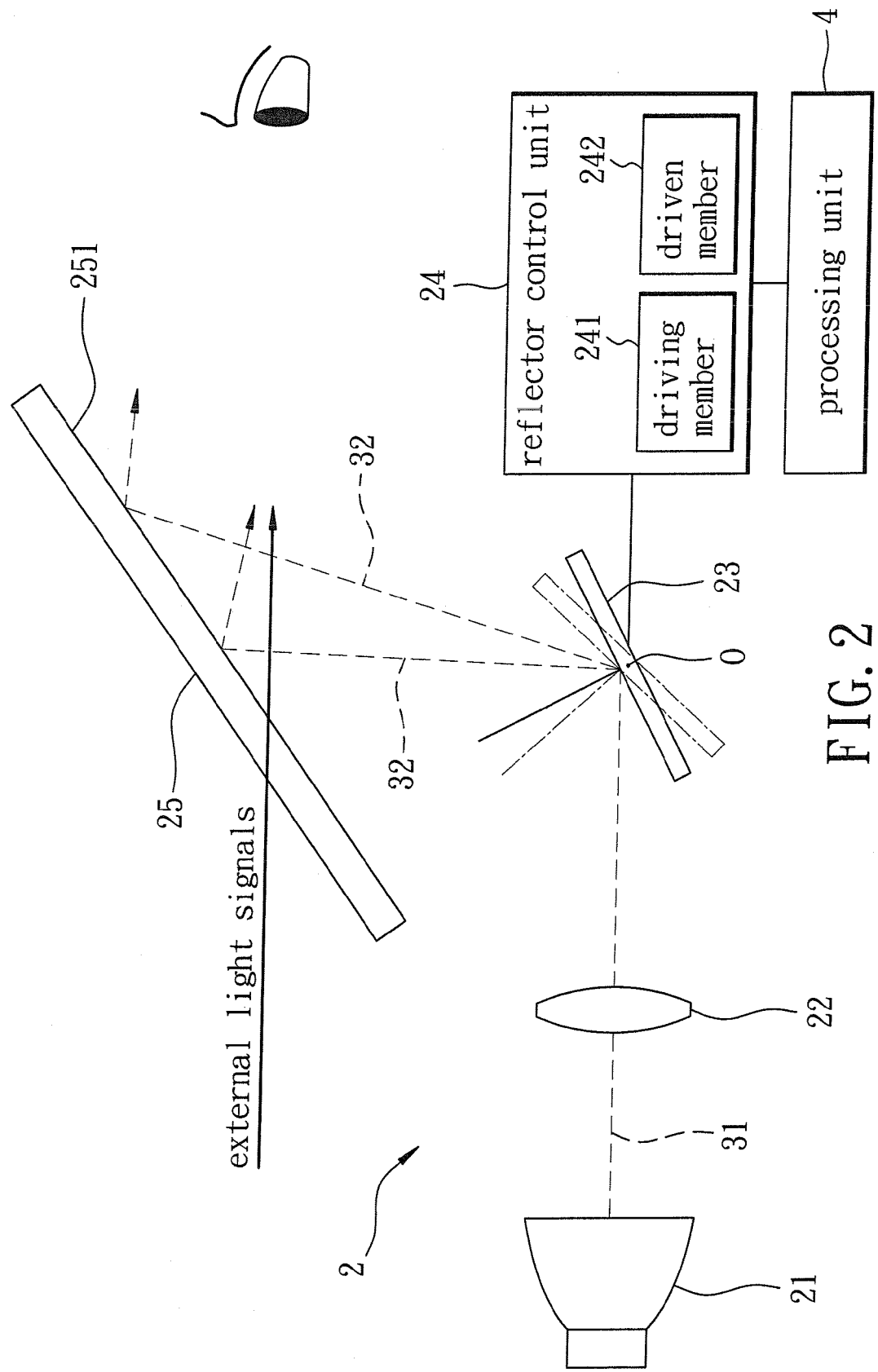
FIG. 2 is a schematic diagram of a first embodiment of a head-up display device according to the invention and a display system using the head-up display device.

As shown in FIG. 2, the first embodiment of a head-up display device 2 according to the present invention includes a light source 21 for providing at least one light signal, a relay lens unit 22, a reflector 23, a reflector control unit 24 and a combiner 25. The relay lens unit 22 is disposed in a first optical path 31 of the light signal provided by the light source 21. The reflector 23 is disposed rotatably in the first optical path 31 for reflecting the light signal provided by the light source 21 and passing through the relay lens unit 22 to a second optical path 32. The reflector control unit 24 is disposed for controlling rotation of the reflector 23 about a rotational center, thereby adjusting the second optical path 32 of the light signal reflected by the reflector 23. The combiner 25 is disposed in the second optical path 32, and includes a surface 251 on which the light signal reflected by the reflector 23 is projected.

In this embodiment, the light source 21 may be configured as a CRT display or a liquid crystal display (LCD), but should not be limited thereto. Since the detailed structures of the light source 21, the relay lens unit 22, the reflector 23 and the combiner 25 are known in art, further details of the same are omitted herein for the sake of brevity.

In this embodiment, the head-up display device 2 is used in a display system that is installed in a vehicle (not shown) and that includes a processing unit 4. Particularly, the processing unit 4 is configured as a processer of an in-vehicle computer that is capable of wireless communication, i.e., the processing unit 4 communicates with the head-up display device 2 wirelessly.

The in-vehicle computer, when being activated along with the head-up display device 2 by a driver, starts to search for a portable electronic device (such as a cell phone or a navigating device with wireless communication function, not shown in the Figures). After being found and identified by the in-vehicle computer, the portable electronic device starts to communicate wirelessly with the in-vehicle computer, for example, by transmitting a piece of a source data to the in-vehicle computer such that an image corresponding to the source data can be displayed by the head-up display device 2.

Regarding arrangement of the combiner 25 of the head-up display device 2, a front windshield of the vehicle is applied with a beam-splitting film to serve as the combiner 25, thereby allowing the light signal projected on the combiner 25 to enter the eyes of the driver simultaneously with an external light signal transmitted through the front windshield.

Further referring to FIGS. 3 and 4, the interaction and detailed operation of the head-up display device 2 and the processing unit 4 of the display system will now be described in the succeeding paragraphs.

First, the processing unit 4 transmits at least one piece of display data based on the source data and at least one control signal that corresponds to the display data. The quantity of each piece of display data transmitted is a known and fixed predetermined amount and corresponds to a screen (not shown) of the light source 21, which has a known fixed size and resolution. When the quantity of the source data is larger than the predetermined amount, the processing unit 4 partitions the source data into a plurality of pieces of display data, and generates a plurality of control signals that correspond respectively to the pieces of display data. Since the size of the combiner 25 is known and fixed, the contents of the control signals respectively corresponding to the pieces of the display data may also be preset contents. The processing unit 4 is then capable of transmitting the display data and the control signals to the head-up display device 2 during a visual persistence time.

The head-up display device 2, after receiving the display data and the control signals, performs display based thereon. In particular, the reflector control unit 24 rotates the reflector 23 for a predetermined rotational angle relative to a rotational center O according to the control signals, such that the light signal reflected by the reflector 23 is projected on the surface 251 of the combiner 25 for displaying an image corresponding to the display data on a predetermined region of the surface 251.

Figure 3:
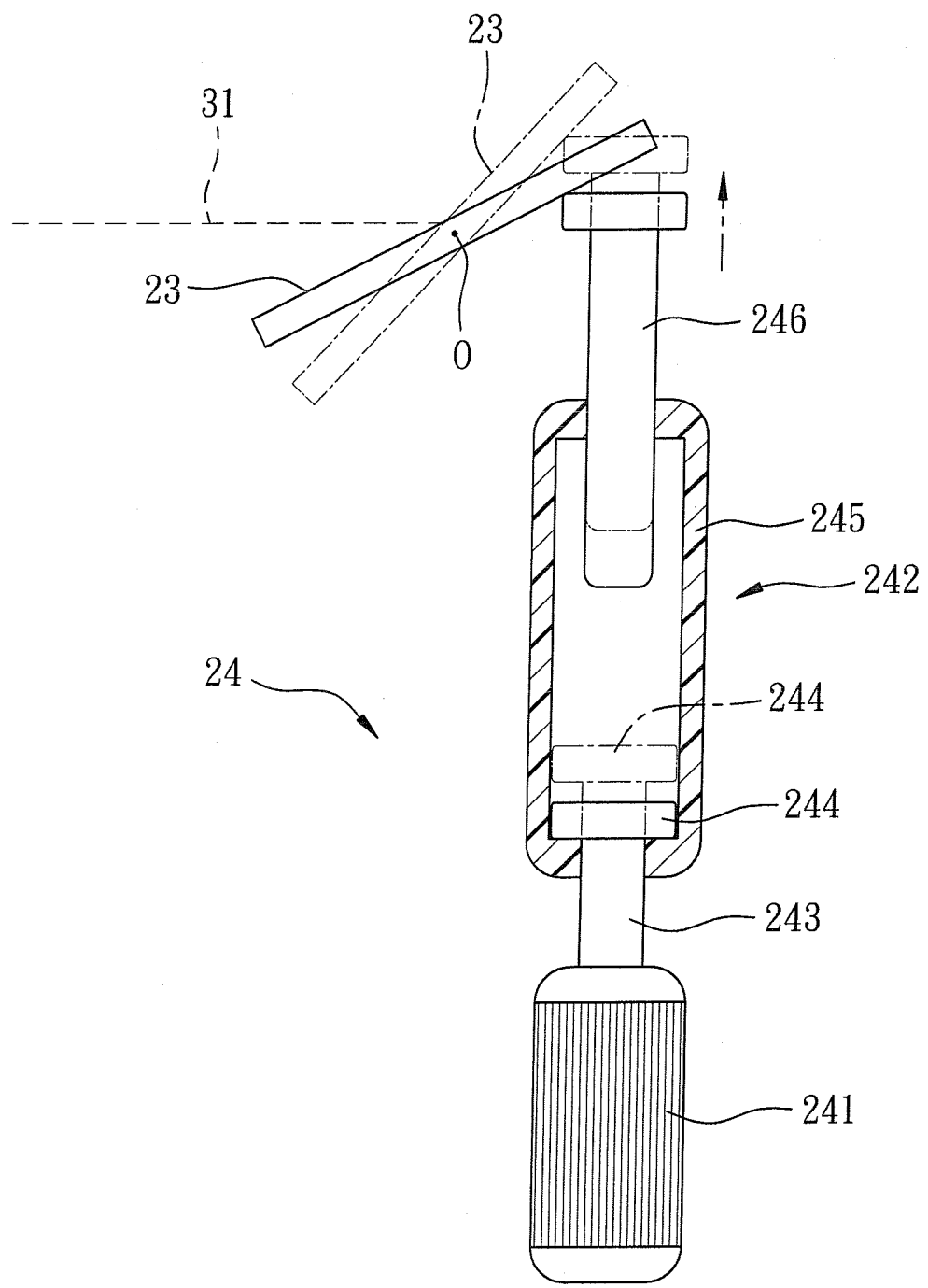
FIG. 3 is a partly sectional view of a reflector control unit of the first embodiment.
Figure 4:
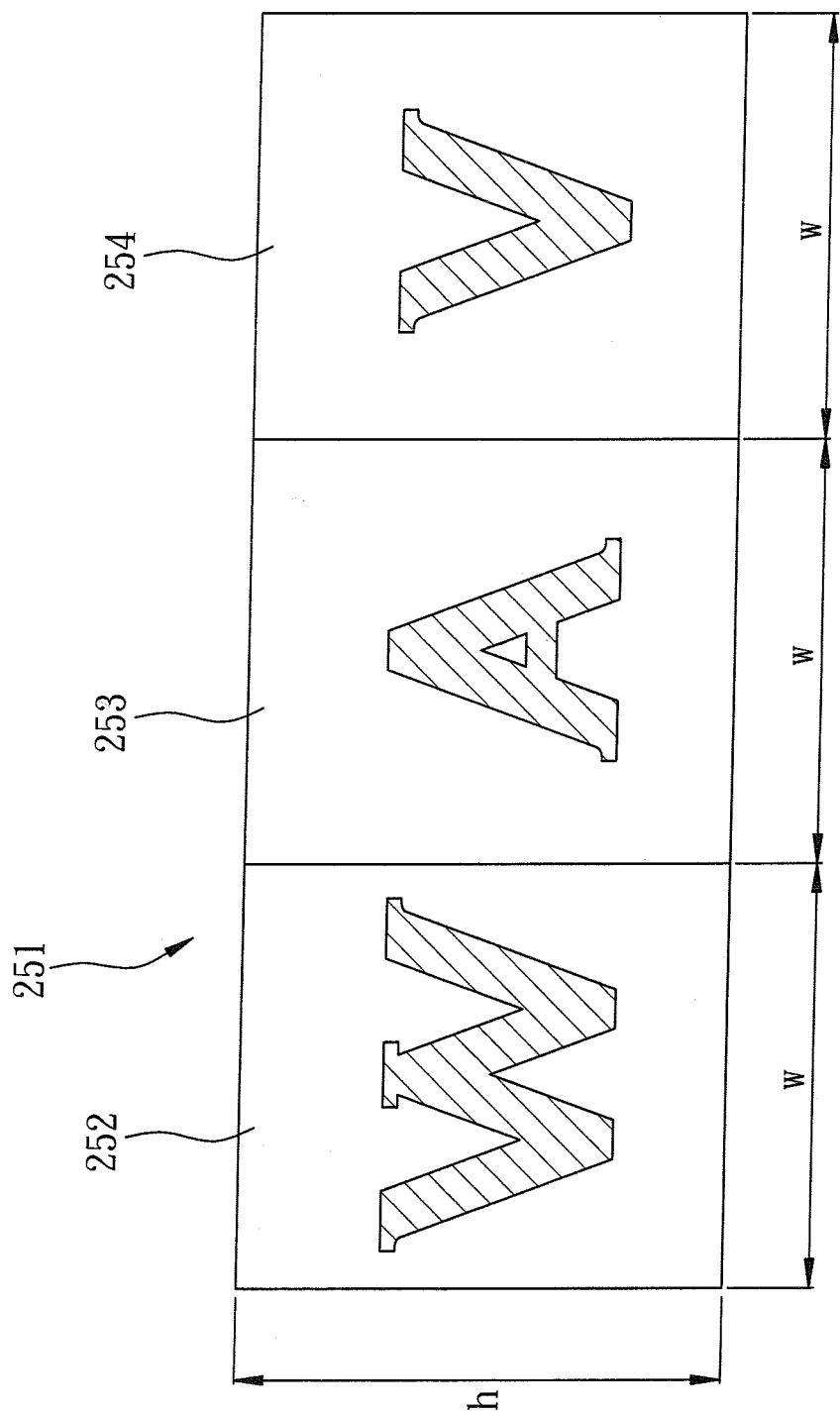
FIG. 4 illustrates an example where multiple images are displayed on a surface of a combiner during a visual persistence period.

As shown in FIG. 3, the reflector control unit 24 of the head-up display device 2 includes a driven member 242 connected to the reflector 23, and a driving member 241 for driving the reflector 23 through the driven member 242 to rotate about the rotational center O for the predetermined rotational angle according to the control signal. In the first embodiment, the driving member 241 of the reflector control unit 24 is configured as a motor. The driven member 242 includes a first movable rod 243, a piston 244, a cylinder 245 and a second movable rod 246. The first movable rod 243 is threadedly coupled to the driving member 241, and the piston 244 is disposed in a chamber defined by the cylinder 245. The driving member 241 drives the first movable rod 243 which pushes the piston 244 to move in the chamber of the cylinder 245, in turn pushing the second movable rod 246 to move along with. The reflector 23 is thus rotated by the second mobile rod 246 for the predetermined rotational angle relative to a rotational center O. It is worth mentioning that while the reflector control unit 24 is disposed vertically in FIG. 3, a horizontal arrangement is also viable. In addition, the reflector control unit 24 can be implemented using a motor-and-rack combination, and is not limited to the disclosure of this embodiment.

An image corresponding to the display data is then visible to the driver on the surface 251 of the combiner 25.

In the following example, it is assumed that the quantity of the source data is larger than the predetermined amount, and the processing unit 4 partitions the source data into three pieces of display data (namely a first piece of display data, a second piece of display data and a third piece of display data), and generates three control signals (namely a first control signal, a second control signal and a third control signal) that correspond respectively to the pieces display data. The processing unit 4 then transmits the display data and the control signals to the head-up display device 2. As shown in FIG. 4, the reflector control unit 24 of the head-up display device 2 rotates the reflector 23 for a first predetermined rotational angle about the rotational center O based on the first control signal, such that the light signal reflected by the reflector 23 is projected on the surface 251 of the combiner 25 to display a first image corresponding to the first piece of display data on a first predetermined region 252 of the surface 251 (with a size of w×h). Afterward, the head-up display device 2 displays a second image corresponding to the second piece of display data on a second predetermined region 253 of the surface 251 and a third image corresponding to the third piece of display data on a third predetermined region 254 of the surface 251 in order. Since all the display operations are completed within the visual persistence time, the three images are thus visible to the driver on the surface 251 of the combiner 25 as if the images are displayed simultaneously.

Figure 5:
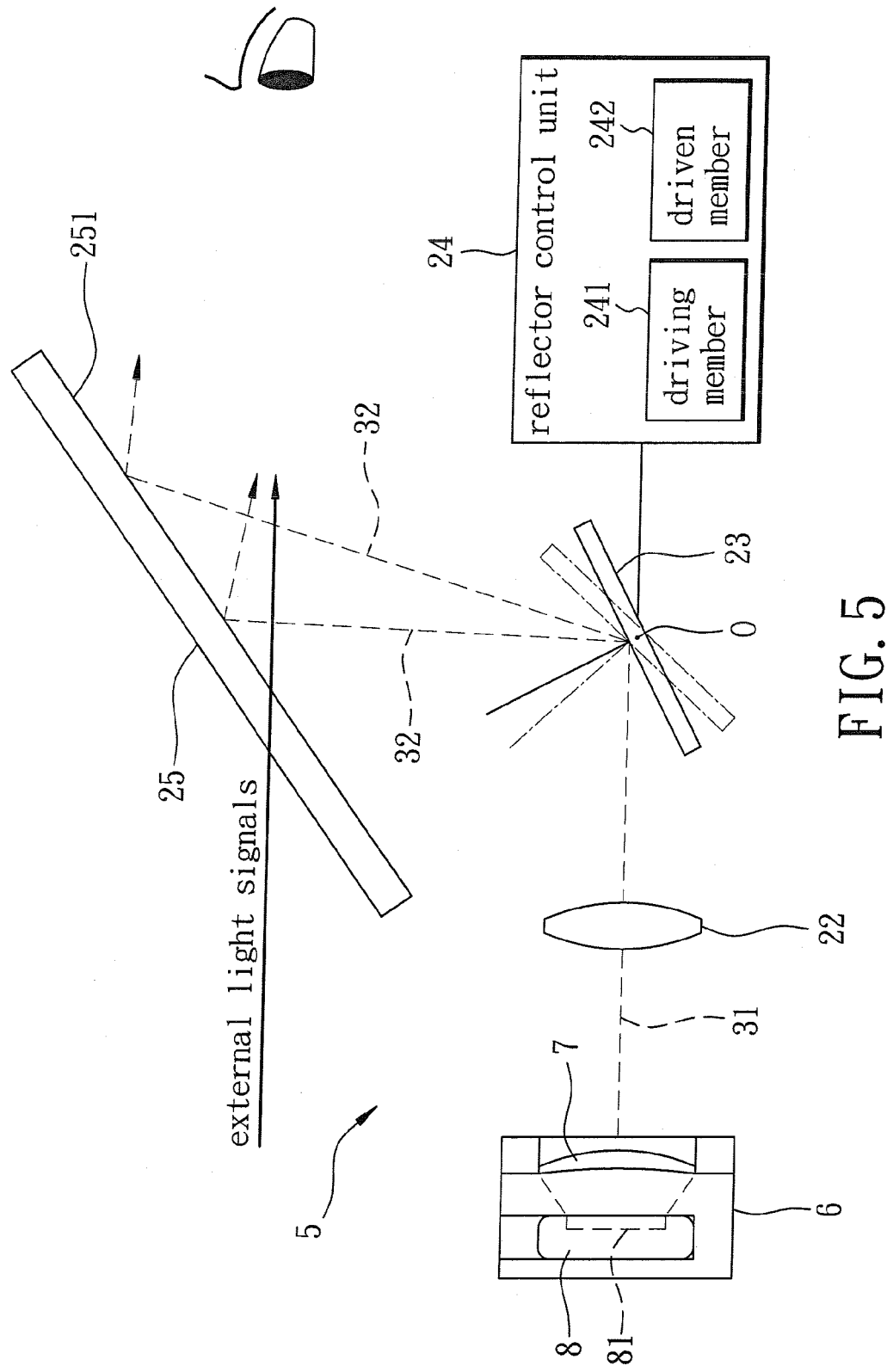
FIG. 5 is a schematic diagram of a second embodiment of the head-up display device according to the invention.

As shown in FIG. 5, the second embodiment of a head-up display device 5 according to the present invention has a structure similar to that of the first embodiment, and is implemented as a kit that is used for a head-up display system. The kit includes a base seat 6, a magnifying glass 7, a relay lens unit 22, a reflector 23, a reflector control unit 24 and a combiner 25. The main difference between this embodiment and the previous embodiment resides in the configuration of the base seat 6 and the magnifying glass 7.

The base seat 6 is adapted to be connected detachably to a portable electronic device 8, which has a display 81 for providing a light signal corresponding to a piece of display data. The magnifying glass 7 is mounted to the base seat 6 and disposed in the first optical path 31, for magnifying an image displayed by the display 81 of the portable electronic device 8.

When attached to the base seat 6, the display 81 of the portable electronic device 8, along with the magnifying glass 7, acts as the light source 21 (see FIG. 2) in the first embodiment. This invention is not limited to the above disclosure. For instance, the magnifying glass 7 may be omitted provided that the size of the display 81 is sufficiently large (substantially as large as the screen of the light source 21).

It is worth mentioning that, in the second embodiment, the head-up display device 5 can also be used in a display system disposed in a vehicle, and a processor (not shown in the Figures) of the portable electronic device 8 acts as the processing unit 4 in the first embodiment. That is, the processor transmits the display data and the corresponding control signals to the head-up display device 5 which, upon receiving the display data and the corresponding control signals, performs display as described in the first embodiment. The second embodiment has the same advantages as those of the first embodiment.

Referring back to FIG. 2 and further to FIG. 5, to sum up, the field of view of the driver can be expanded by the reflector control unit 24 that controls rotation of the reflector 23 for adjusting the second optical path 32 of the light signal reflected by the reflector 23, without having to increase the sizes of the screen of the light source 21, the relay lens unit 22 and the reflector 23. Additionally, the processing unit 4 is capable of transmitting a plurality of pieces of display data and a plurality of control signals that correspond respectively to the display data to the head-up display device 2 during a visual persistence period, allowing multiple images and more information to be displayed on the surface 251 of the combiner 25 and perceived by the driver as if they are displayed simultaneously.

While the present invention has been described in connection with what are considered the most practical and embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A head-up display device adapted to be connected detachably to a portable electronic device that has a display for providing at least one light signal corresponding to a piece of display data, and that generates at least one control signal corresponding to the piece of display data, said head-up display device comprising:
   a base seat adapted to be connected detachably to the portable electronic device;
   a reflector adapted to be disposed rotatably in a first optical path of the light signal provided by the display for reflecting the light signal provided by the display to a second optical path;
   a reflector control unit adapted for receiving the control signal and controlling rotation of said reflector about a rotational center according to the control signal, thereby adjusting the second optical path of the light signal reflected by said reflector;
   a magnifying glass mounted to said base seat and disposed in the first optical path for magnifying an image displayed by the display of the portable electronic device prior to the image being reflected by said reflector; and
   a surface disposed in the second optical path;
   wherein, when said reflector is rotated for a predetermined rotational angle about the rotational center by said reflector control unit according to the control signal, the light signal reflected by said reflector is projected on said surface to display an image corresponding to the display data on a predetermined region of said surface.

* * * * *